United States Patent [19]

Mori

[11] Patent Number: 5,036,618
[45] Date of Patent: Aug. 6, 1991

[54] LIVING THING NURTURING DEVICE

[76] Inventor: Kei Mori, 3-16-3-501, Kaminoge, Setagaya-Kuo Tokyo, Japan

[21] Appl. No.: 117,450

[22] Filed: Oct. 30, 1987

Related U.S. Application Data

[63] Continuation of Ser. No. 837,444, Mar. 7, 1986, abandoned.

[30] Foreign Application Priority Data

Mar. 27, 1985 [JP] Japan .................. 60-62670

[51] Int. Cl.⁵ .................. A01G 1/04; A01G 9/00; A01K 61/00
[52] U.S. Cl. .................. 47/1.1; 47/1.4; 47/17; 119/3
[58] Field of Search .................. 47/1.1, 1.4, 17, 59–65, 47/79; 236/91 A, 2, 44 E; 62/171, 307; 261/120, 121.1, DIG. 3; 119/3

[56] References Cited

U.S. PATENT DOCUMENTS

| | | | |
|---|---|---|---|
| 1,161,350 | 11/1915 | Sinclair | 261/127 |
| 2,937,506 | 5/1960 | Stirlen | 62/171 X |
| 3,420,739 | 1/1969 | Bongers et al. | 47/1.4 |
| 4,003,160 | 1/1977 | Müller | 47/1.4 |
| 4,026,243 | 5/1977 | Jessop | 47/69 |
| 4,057,930 | 11/1977 | Barham | 47/79 |
| 4,057,933 | 11/1977 | Enyeart | 47/62 |
| 4,077,158 | 3/1978 | England | 47/17 |
| 4,597,917 | 7/1986 | Lunsford | 261/121.1 X |

OTHER PUBLICATIONS

Dempewolff, R. F., "Gardens to Feed Our Spacemen", Popular Mechanics, Jun. 1960, vol. 113, No. 6, pp. 123–127, 236, 238, 240 and 242 (only) relied on.

Primary Examiner—James R. Feyrer
Attorney, Agent, or Firm—Jordan and Hamburg

[57] ABSTRACT

A living thing nurturing device for nurturing plants which absorb carbon dioxide and produce oxygen and funguses or fish produce oxygen and produce carbon dioxide comprises a first air-tight receptacle for the nurturing plants and a second air-tight receptacle for nurturing the funguses or fish. Air in the first air-tight receptacle containing a sufficient amount of oxygen is supplied into the second air-tight receptacle and air in the second air-tight receptacle containing a sufficient amount of carbon dioxide is supplied into the first air-tight receptacle. A water tank is installed in the first air-tight receptacle and the temperature of water contained in the water tank is controlled at a value a little lower than the temperature suitable for nurturing the plants, and air containing a sufficient amount of carbon dioxide emitted from the second air-tight receptacle is supplied through the water tank into the first air-tight receptacle. Other water tank is installed in the second air-tight receptacle and the temperature of water contained in the another water tank is controlled at a value higher than the temperature suitable for nurturing the funguses, and air containing a sufficient amount of oxygen emitted from the first air-tight receptacle is supplied through the other water tank into the second air-tight receptacle.

7 Claims, 1 Drawing Sheet

LIVING THING NURTURING DEVICE

This application is a continuation of application Ser. No. 837,444, filed Mar. 7, 1986 now abandoned.

BACKGROUND OF THE INVENTION

The present invention relates to a living thing nurturing device, in particular, a device for effectively nurturing plants such as vegetables or the like which absorbs carbon dioxide and produces oxygen and funguses such as mushroom or fish which absorbs oxygen and produces carbon dioxide by profitably utilizing oxygen and carbon dioxide produced by the living things as mentioned above.

The present applicant has previously proposed various types of living thing nurturing devices for nurturing plants absorbing carbon dioxide $CO_2$ and producing oxygen $O_2$ and animals such as fish absorbing oxygen $O_2$ and producing carbon dioxide $CO_2$, in which plants and animals profitably exist together. Oxygen $O_2$ produced by the plants is supplied to the fish while carbon dioxide $CO_2$ produced by the fish is supplied to the plants with the intension of coexistence thereof.

On that occasion, for instance, in the case of cultivating vegetables such as tomatoes or the like as the aforementioned plants, usually, the vegetables can be most effectively nurtured at an approximate temperature of 20° C. and a relative humidity of appoximately less than 60%. For this reason, the plants are cultivated in an air-tight receptacle, in which environment factors such as temperature, relative humidity, and the content rate of carbon dioxide $CO_2$ is controlled at an optimum value for raising the plants. However, environment factors in air-tight receptacle change in accordance with the temperature and the humidity, etc. of the carbon dioxide $CO_2$ supplied thereto, and therefore it is very difficult to control environment factors in an air-tight receptacle.

SUMMARY OF THE INVENTION

It is an object of the present invention to nurture or breed living things such as plants, the funguses, or fish effectively and economically.

It is another object of the present invention to nurture plants which absorbs carbon dioxide $CO_2$ and produced oxygen $O_2$ and funguses or fishes which absorbs oxygen $O_2$ and produces carbon dioxide $CO_2$ in a profitably combined state in order to effectively nurture those plants, funguses, or fish.

It is another object of the present invention to provide a device for effectively nurturing plants such as vegetables or the like absorbing carbon dioxide and producing oxygen and funguses such as mushroom or fish absorbing oxygen and producing carbon dioxide by profitably utilizing oxygen and carbon dipxide produced by the living things as mentioned above.

It is another object of the present invention to provide a living thing nurturing device in which a plant cultivating device for absorbing carbon dioxide $CO_2$ and producing oxygen $O_2$ and a fungus nurturing device or a fish breeding device for absorbing oxygen $O_2$ and producing carbon dioxide $CO_2$ are profitably combined together in order to effectively nurture those plants, funguses, or fish.

The above-mentioned features and other advantages of the present invention will be apparent from the following detailed description which goes with the accompanying drawings.

DESCRIPTION OF THE PREFERRED EMBODIMENT

Figure 1:
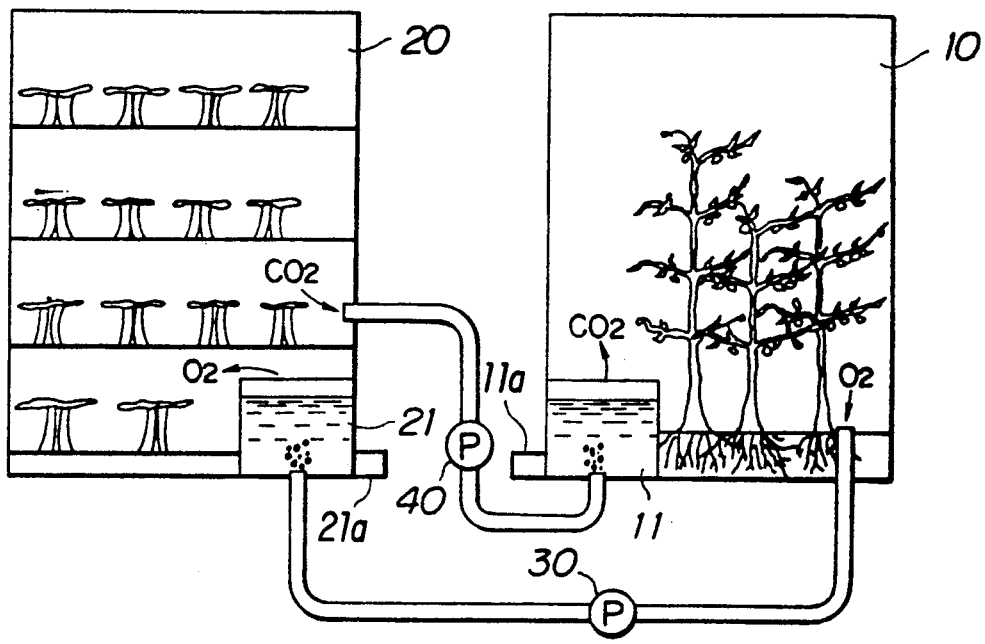
FIG. 1 is a cross-sectional structural view for explaining an embodiment of the present invention.

FIG. 1 is a cross-sectional structural view for explaining an embodiment of the present invention. In FIG. 1, 10 is a first air-tight receptach for nurturing plants absorbing carbon dioxide $CO_2$ and producing oxygen $O_2$, 20 a second air-tight receptacle for nurturing funguses such as, for instance, bracket fungus absorbing oxygen $O_2$ and producing carbon dioxide $CO_2$, 30 a first pumping device for supplying oxygen $O_2$ produced in the first air-tight receptacle 10 into the second air-tight receptacle 20, and 40 a second pumping device for supplying carbon dioxide $CO_2$ produced in the second air-tight receptacle 20 into the first air-tight receptacle 10.

Oxygen $O_2$ produced in the first air-tight receptacle 10 and carbon dioxide $CO_2$ produced in the second air-tight receptacle 20 are exchanged for each other in order to supply a sufficient amount of oxygen $O_2$ to the plants in the first air-tight receptacle 10 and supply a sufficient amount of carbon dioxide $CO_2$ to the funguses in the second air-tight receptacle 20.

And further, in the living thing nurturing device as mentioned above, the temperature in the air-tight receptacle 10 for nurturing the plants is kept at 20° C. approximately and the relative humidity therein is kept below 60% approximately while the temperature in the air-tight receptacle 20 for nurturing the the funguses or the like is kept at 30° C. approximately and the relative humidity therein is kept above 80% approximately. Therefore, both of the plants and the funguses can be nurtured effectively. On that occasion, if air contained in the air-tight receptacle 10 is merely guided into the air-tight receptacle 20, the temperature in the receptacle 20 would drop and the relative humidity therein would also drop. On the contrary, air contained in the air-tight receptacle 20 is guided into the air-tight receptacle 10, and the temperature in the receptacle 10 rises and the relative humidity therein also rises.

The present invention was made in order to resolve the problems as mentioned above. As shown in FIG. 1, a water tank 11 is installed in the air-tight receptacle 10 and another water tank 21 is installed in the air-tight receptacle 20. The temperature of the water tank 11 is controlled by temperature control means 11a at a value, for instance, 15° C. approximately which is a little lower than the temperature suitable for nurturing the plants in the air-tight receptacle 10, and the temperature of the water tank 21 is controlled by temperature control means 21a at a value, for instance, 35° C. approximately which is a little higher than the temperature in the air-tight receptacle 20. Air contained in the air-tight receptacle 20 is supplied into the air-tight receptacle 10 through the water tank 11, while air contained in the air-tight receptacle 10 is supplied into the air-tight receptacle 20 through the water tank 21.

In such a manner, air of high temperature and high humidity in the air-tight receptacle 20 is supplied into the air-tight receptacle 10 by passing through the water tank 11, and the temperature in the receptacle 10 is kept at 20° C. approximately and the relative humidity therein is kept less than 60% approximately. On the contrary, air of low temperature and low humidity in the air-tight receptacle 10 is supplied into the air-tight receptacle 20 by passing through the water tank 21, and the temperature in the receptacle 20 is kept at 30° C. approximately and the relative humidity therein is kept more than 80% approximately.

In consequence, the temperature and the humidity in the air-tight receptacle 10 are always kept resepectively at the values suitable for nurturing the plants in the air-tight receptacle 10, and a sufficient amount of carbon dioxide $CO_2$ necessary for nurturing the plants is supplied to the plants. At the same time, the temperature and the humidity are also kept respectively at the values suitable for nurturing the funguses in the air-tight receptacle 20 at all times, and a sufficient amount of oxygen $U_2$ necessary for nurturing the funguses is supplied to the funguses.

Figure 2:
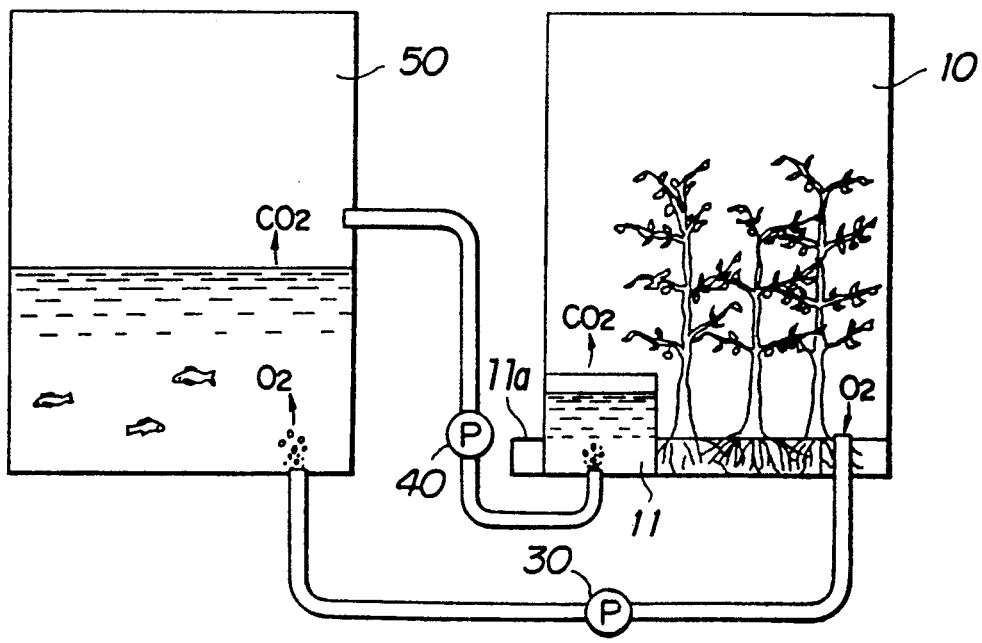
FIG. 2 is a cross-sectional structural view for explaining another embodiment of the present invention.

FIG. 2 is a cross-sectional structural view for explaining another embodiment of the present invention. In this embodiment, fish are employed as the living things absorbing oxygen $O_2$ and producing carbon dioxide $CO_2$. Namely, fish are empolyed instead of the funguses of the embodiment shown in FIG. 1. In FIG. 2, 50 is an air-tight receptacle for breeding the fish. As is the case of the embodiment shown in FIG. 1, carbon dioxide $CO_2$ produced by the fish is utilized for nurturing the plants and oxygen produced by the plants is utilized for breeding the fish, in this embodiment. In FIG. 2, the temperature of the water in water tank 11 is controlled by temperature control means 11a.

Furthermore, although only oxygen $O_2$, carbon dioxide $CO_2$, the temperature and the humidity have been described heretofore, various conditions other than the above-mentioned, for instance, nutritious substance, light rays, etc. are needed for nurturing the plants, the funguses, the fish or the like. However, since those conditions such as the nutritious substance, the light rays, etc. have no immediate connection with the present invention, the explanation about those conditions is omitted.

As is apparent from the foregoing description, according to the present invention, it will be possible to nurture the living things such as the plants, the funguses, and the fish effectively and economically.

I claim:

1. A living thing nurturing device comprising a first air-tight receptacle for nurturing plants which absorb carbon dioxide and produce oxygen, a second air-tight receptacle for nurturing animal water-life which absorb oxygen and produce carbon dioxide, said second receptacle having a first water tank means for said animal water life and an open space overlying said first water tank means, first conduit means leading from said first receptacle to said second receptacle for conducting air and produced oxygen from said first receptacle to said second receptacle, second conduit means leading from said open space of said second receptacle to said first receptacle for conducting air and produced carbon dioxide from said second receptacle to said first receptacle, said first conduit means being connected to said first tank means such that the air and produced oxygen in said first conduit means passes into the water in said first tank means in said second receptacle, a second water tank means in said first receptacle, temperature control means for controlling the temperature of the water in said second tank means to a temperature lower than the temperature suitable for nurturing the plants in said first receptacle, said second conduit means being connected to said second tank means such that the air and produced carbon dioxide in said second conduit means passes through the water in said second tank means before entering said first receptacle.

2. A living thing nurturing device according to claim 1, wherein said temperature control means maintains the water in said second water tank means at a temperature of approximately 15° C.

3. A living thing nurturing device according to claim 1, wherein said temperature control means maintains the water in said second water tank means at a temperature of approximately 20° C.

4. A living thing nurturing device comprising a first air-tight receptacle for nurturing plants which absorb carbon dioxide and produce oxygen, a second air-tight receptacle for nurturing funguses which absorb oxygen and produce carbon dioxide, first conduit means leading from said first receptacle to said second receptacle for conducting air and produced oxygen from said first receptacle to said second receptacle, sacond conduit means leading from said second receptacle to said first receptacle for conducting said first receptacle, a first water tank means in said second receptacle, first temperature control means for controlling the temperature of the wate in said first tank means to a temperature higher than the temperature in said second receptacle which latter temperature is suitable for nurturing the funguses in said second receptacle, said first conduit means being connected to said first tank means such that the air and produced oxygen in said first conduit means passes through the water in said first tank means before entering said second receptacle, a second water tank means in said first receptacle, second temperature control means for controlling the temperature of the water in said second tank means to a temperature lower than the temperature in said first receptacle which latter temperature is suitable for nurturing the plants in said first receptacle, said second conduit means being connected to said second tank means such that the air and produced carbon dioxide in said second conduit means passes through the water in said second tank means before entering said first receptacle, whereby the first and second receptacles operate at different temperatures as the air, the produced oxygen and the produced carbon dioxide are continuously exchanged between said first and second receptacles.

5. A living thing nurturing device comprising a first air-tight receptacle for nurturing plants which absorbs carbon dioxide and produce oxygen, first temperature control means for maintaining a first temperature in said first receptacle suitable for nurturing plants, a second air-tight receptacle for nurturing funguses which absorb oxygen and produce carbon dioxide, second temperature control means for maintaining a second temperature in said second receptacle suitable for nurturing said funguses, said first temperature being lower than said second temperature, first conduit means leading from said first receptacle to said second receptacle for conducting air and produced oxygen fron said first receptacle to said second receptacle, second conduit means leading from said second receptacle to said first receptacle for conducting air and produced carbon dioxide from said second receptacle to said first receptacle, said second temperature control means comprising a first water tank means in said second receptacle and heater means for heating the water in said first tank means to a temperature higher than said second temperature, said first conduit means being connected to said first tank means such that the air and produced oxygen in said first conduit means passes through the water in said first tank means and is heated thereby before entering said second receptacle, said second temperature control means comprising a second water tank means in said first receptacle and cooling means for cooling the water in said second tank means to a temperature lower than said first temperature, said second conduit means being connected to said second tank means such that the air and produced carbon dioxide in said second conduit means passes through the water in said second tank means and is cooled thereby before entering said first receptacle, whereby the first and second receptacles operate at different temperatures as the air, the produced oxygen and the produced carbon dioxide are continuously exchanged between said first and second receptacles.

6. A living thing nurturing device according to claim 5, wherein said first temperature is approximately 20° C. and the temperature of said second water tank is approximately 15° C.

7. A living thing nurturing device according to claim 5, wherein said second temperature is approximately 30° C. and the temperature of said first water tank is approximately 35° C.

* * * * *